United States Patent [19]

Kasai

[11] Patent Number: 5,448,147
[45] Date of Patent: Sep. 5, 1995

[54] SELECTABLE FEEDBACK CONTROL SYSTEM

[75] Inventor: Shigeru Kasai, Yamanashi, Japan

[73] Assignee: Tel-Varian Limited, Nirasaki, Japan

[21] Appl. No.: 57,901

[22] Filed: May 7, 1993

[30] Foreign Application Priority Data

| May 8, 1992 [JP] | Japan | 4-143243 |
| May 19, 1992 [JP] | Japan | 4-151579 |

[51] Int. Cl.⁶ ............................................. G05B 13/00
[52] U.S. Cl. ........................ 318/568.17; 318/568.22; 318/590
[58] Field of Search ............. 318/560, 568.17, 568.22, 318/590, 591, 609, 610, 632, 638; 364/148, 149, 160–165

[56] References Cited

U.S. PATENT DOCUMENTS

| 4,679,136 | 7/1987 | Shigemasa | 364/162 X |
| 4,991,770 | 2/1991 | Bird et al. | 318/610 X |
| 4,998,051 | 3/1991 | Ito | 318/632 |
| 5,034,312 | 7/1991 | Saito | 364/149 X |

Primary Examiner—William M. Shoop, Jr.
Assistant Examiner—Brian Sircus
Attorney, Agent, or Firm—Oblon, Spivak, McClelland, Maier, & Neustadt

[57] ABSTRACT

A control system includes a first estimation section for estimating a first state variable of a plant object such as a semiconductor wafer temperature control arrangement on the basis of a control input supplied to the plant object and an output from the plant object, a second estimation section for estimating a second state variable of the plant object on the basis of the control input alone, a switching section for selecting one of the first and second estimation sections, and a servo section for adjusting the control input by feeding back the state variable from the first or second estimation section to an input section of the plant object.

11 Claims, 9 Drawing Sheets

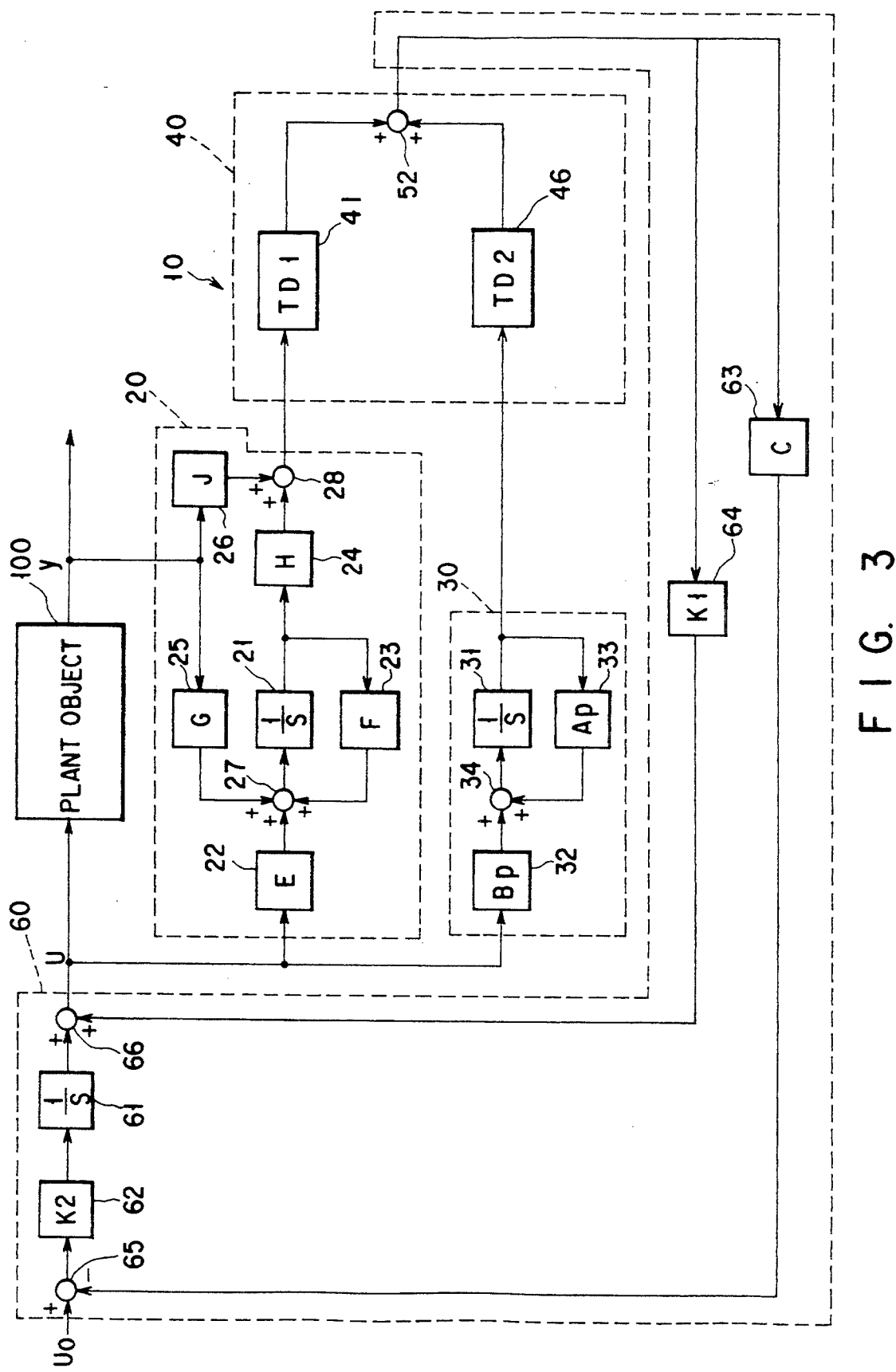
F I G. 3

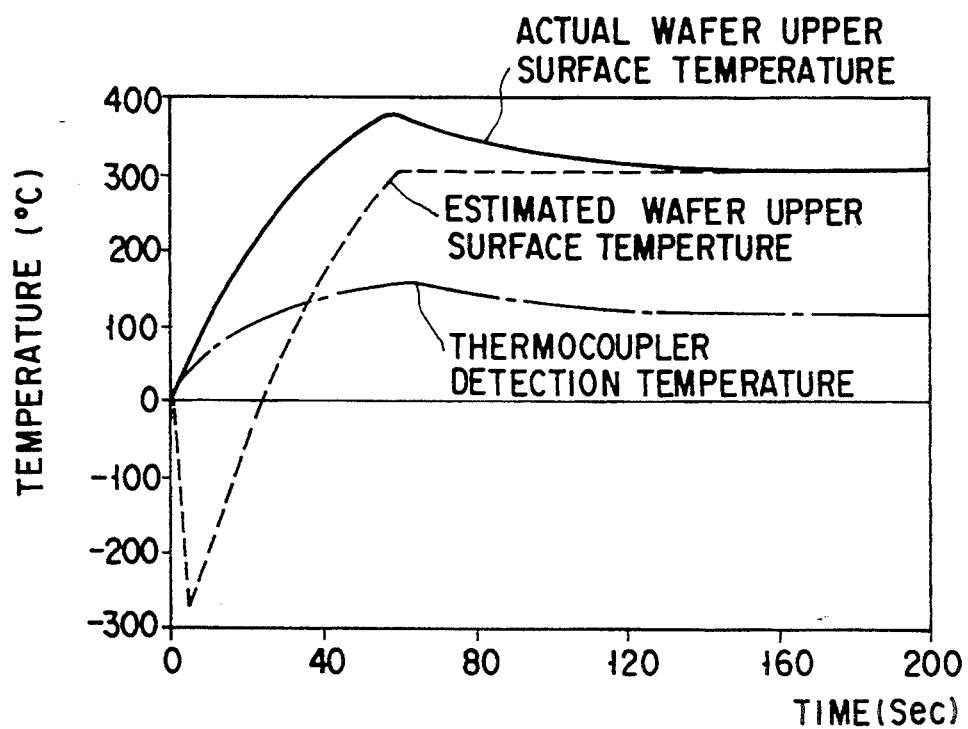
F I G. 7
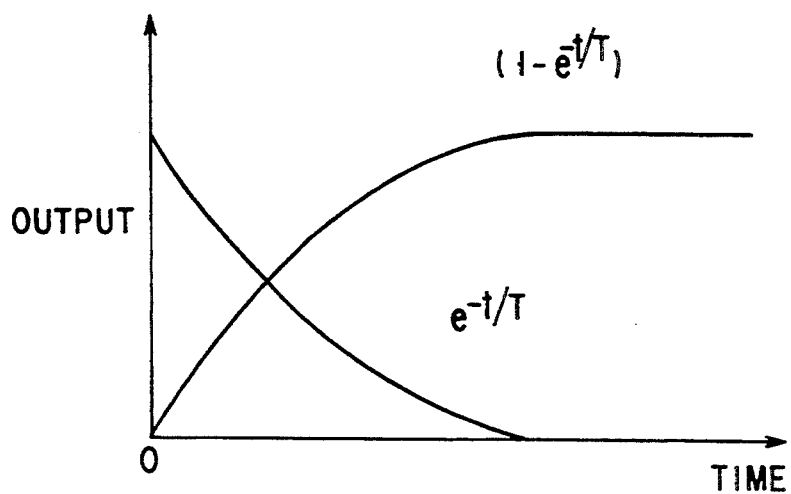
F I G. 8

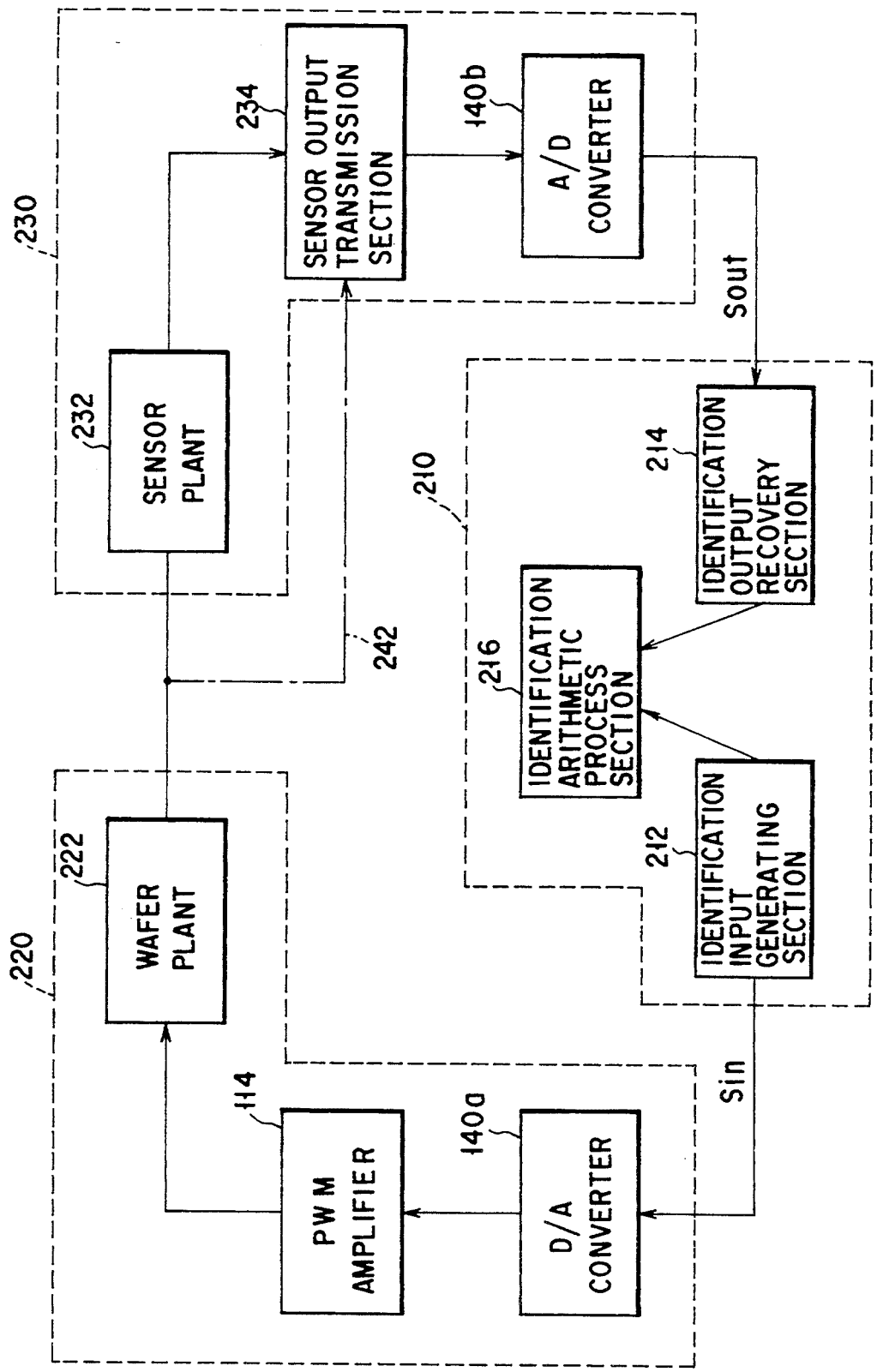
F I G. 10

SELECTABLE FEEDBACK CONTROL SYSTEM

BACKGROUND OF THE INVENTION

1. Field of the Invention

The present invention relates to a control system for executing feedback control.

2. Description of the Related Art

For example, in a photolithography process or CVD (Chemical Vapor Deposition) process in the manufacture of semiconductor devices, a semiconductor wafer as an object is treated while controlling the temperature of the semiconductor wafer to a predetermined value. In general, temperature control of this type adopts feedback control.

A typical feedback control method for the wafer temperature control is based on a PID controller. The PID controller is constituted by combining a proportional action (P), an integral action (I), and a derivative action (D), and calculates a manipulated variable u from the following equation on the basis of a deviation e between a wafer temperature detection value and a wafer temperature preset value:

$$u = Kp \cdot e + KI \int e \cdot dt + KD \cdot de/dt \quad (1)$$

where the coefficients KP, KI, and KD respectively represent the sensitivities of the proportional, integral, and derivative actions, and are set according to the characteristics of the corresponding control system.

The PID controller adjusts an energy supply amount to a wafer heating arrangement on the basis of the manipulative variable u calculated from equation (1), so that the deviation e becomes zero, i.e., a control variable is caused to coincide with a target value.

However, the wafer temperature control suffers from temporal and positional deviations between wafer temperature detection and a wafer temperature to be actually controlled. More specifically, when the temperature of a wafer in a process is detected, since a thermal sensor such as a thermocoupler cannot be attached to a to-be-treated surface (upper surface) of the wafer, the thermal sensor is attached to the peripheral edge portion of the lower surface of the wafer to detect the wafer temperature. For this reason, the wafer temperature detection value obtained by the thermal sensor represents the temperature of the peripheral edge portion of the lower surface of the wafer, and does not represent the temperature of the to-be-treated surface (upper surface) of the wafer. Therefore, in the control method of the PID controller, since control for feeding back such a wafer temperature detection value, and causing it to coincide with a preset value is executed, it is difficult to cause the temperature of the to-be-treated surface (upper surface) of the wafer to coincide with a desired value.

SUMMARY OF THE INVENTION

It is an object of the present invention to provide a control system, which can cause a control variable to precisely coincide with a desired value even when a control variable and a detection value have a deviation therebetween, and can guarantee a stable control operation in a warm-up state of the system.

According to the present invention, there is provided a control system comprising a estimation section for estimating a state variable of a plant object on the basis of a control input alone, a switching section for selecting one of the output from the plant object and the output from the estimation section, and a servo section for adjusting the control input by feeding back the output from the plant object or the state variable from the estimation section to an input section of the plant object.

According to the present invention, there is also provided a control system comprising a first estimation section for estimating a first state variable of a plant object on the basis of a control input supplied to the plant object and an output from the plant object, a second estimation section for estimating a second state variable of the plant object on the basis of the control input alone, a switching section for selecting one of the outputs from the first and second estimation sections, and a servo section for adjusting the control input by feeding back the state variable from the first or second estimation section to an input section of the plant object.

According to the present invention, there is also provided a plant identification system comprising the step of supplying a predetermined input to a predetermined system consisting of a to-be-identified plant having an unknown parameter and at least one plant or a plurality of related plants having known parameters, and measuring an output from the system, and the step of obtaining the parameter of the to-be-identified plant on the basis of input data, data output from the system, and a response characteristic of a mathematical model of the related plants.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a block diagram showing a control system corresponding to the embodiment shown in FIG. 2;

FIG. 7 is a graph showing the rising characteristics of the wafer upper surface temperature obtained when no pseudo system is used in the control system of the present invention;

FIG. 8 is a graph showing the switching timing of estimation sections in the control system of the present invention;

FIG. 10 is a block diagram showing an identification system applied to the wafer temperature control apparatus shown in FIG. 4;

DETAILED DESCRIPTION OF THE PREFERRED EMBODIMENTS

Figure 1:
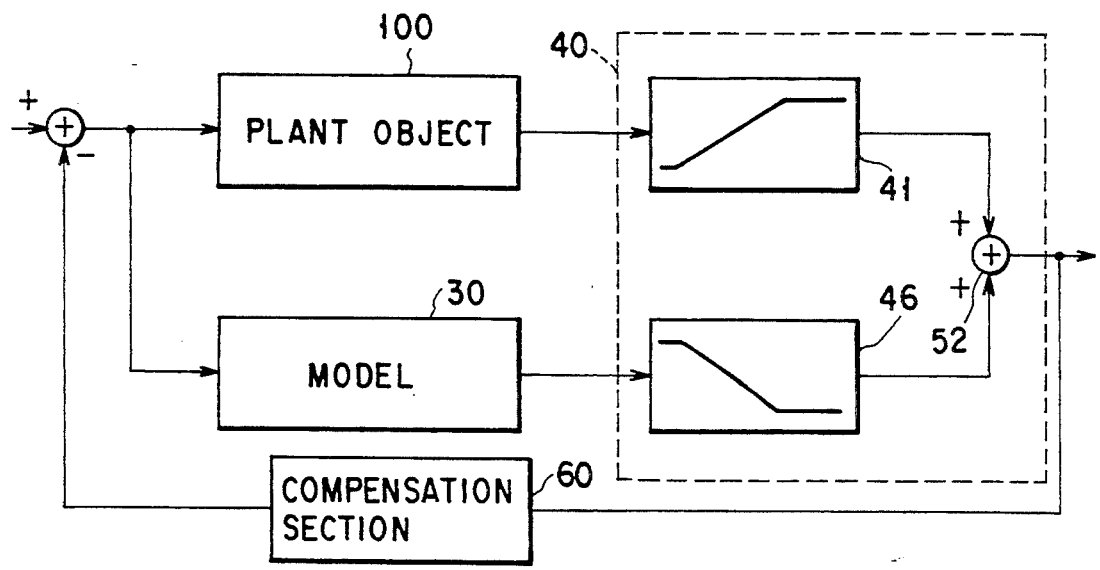
FIG. 1 is a block diagram showing a control system according to an embodiment of the present invention.

According to a control system of an embodiment shown in FIG. 1, a controller 10 for controlling a plant object 100 may be an apparatus which can be realized by a microcomputer in a software manner, and functionally comprises a pseudo section, i.e., a plant model 30, a switching section 40, and a servo section 60.

The plant object 100 receives a control signal from the servo section 60, and generates an output signal. The control signal is also input to the plant model 30. The plant model 30 estimates the output signal from the plant object 100 on the basis of the input control signal, and outputs an estimated output signal. The output signal from the plant object 100 and the estimated output signal from the plant model 30 are input to the switching section 40. The switching section 40 comprises a delay process section 41 having gradually rising characteristics, and a delay process section 46 having gradually falling characteristics. Therefore, in an early stage, the output signal from the plant object 100 is suppressed by the delay process section 41, and the presumed output signal from the plant model 30 is input to an adder 52 via the delay process section 46. In other words, in a warm-up state of an apparatus, the estimated output signal from the plant model 30 is input as a feedback signal to the servo section via the delay process section 46 and the adder 52, and when the plant object 100 is stabilized, the actual output signal from the plant object 100 is input to the servo section 60 via the delay process section 41 and the adder 52. At this time, since the estimated output signal from the plant model 30 is suppressed by the delay process circuit 46, it has almost no contribution to the feedback signal.

More specifically, in this embodiment, the output signal from the plant object 100 and the estimated output signal from the plant model 30 are selectively input to the servo section 60.

Figure 2:
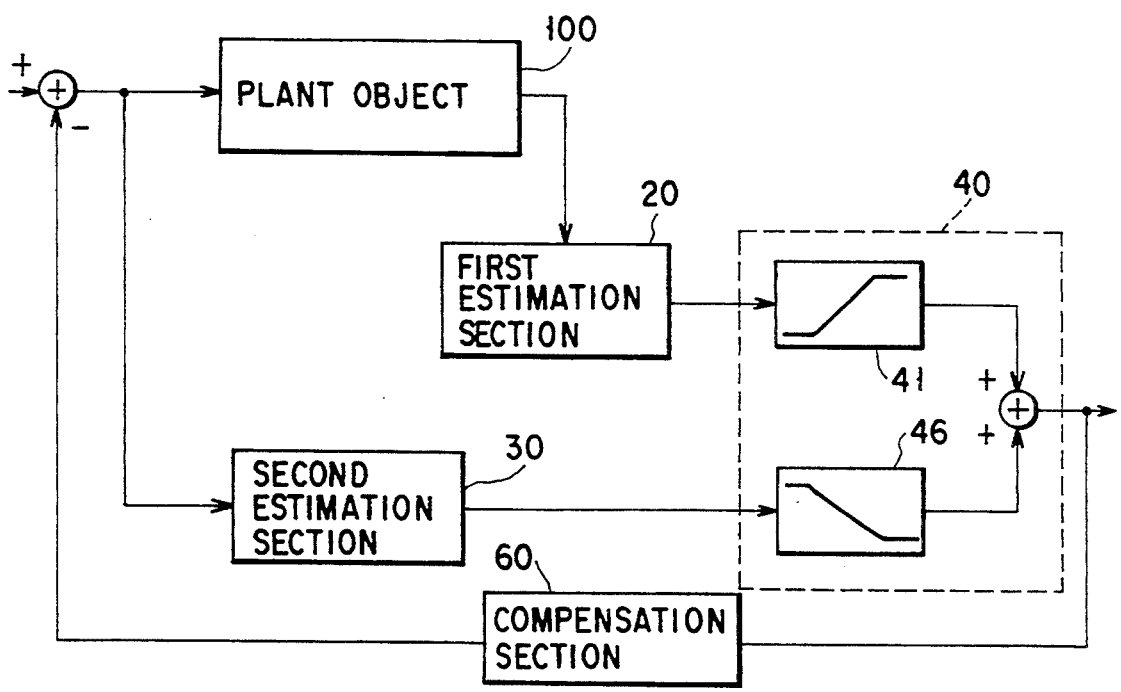
FIG. 2 is a block diagram showing a control system according to another embodiment of the present invention.

According to the second embodiment shown in FIG. 2, a first estimation section 20 for receiving a control input signal and the output signal from the plant object 100, and estimating a state variable of the plant object 100 on the basis of the control input signal and the output signal from the plant object 100 is arranged. A first estimation signal from the first estimation section 20 and a second estimation signal from the plant model, i.e., the second estimation section 30 are respectively input to the delay process sections 41 and 46 of the switching section 40.

According to the second embodiment, the first estimation section 20 estimates an upper surface temperature of a wafer on the basis of an output signal supplied from the plantcontrolled object 100, and associated with, e.g., a lower surface temperature of the wafer, and a control input signal, and supplies the first estimation signal corresponding to the estimated upper surface temperature to the delay process section 41 of the switching section 40. In a warm-up state of an apparatus, the switching section 40 supplies the second estimation signal from the second estimation section 30 to the servo section 60 via the second delay process section 46 and the adder 52, and when the plant object is stabilized, the switching section 40 supplies the first estimation signal to the servo section 60 via the first delay process section 41 and the adder 52.

That is, in the second embodiment, the first and second estimation signals are selectively input to the servo section 60.

FIG. 3 is a block diagram showing the detailed arrangement of the embodiment shown in FIG. 2. The second embodiment will be described in more detail below with reference to FIG. 3.

According to the control system shown in FIG. 3, a Luenberger observer, i.e., the first estimation section 20 comprises an integrator 21, five coefficient multipliers 22 to 26, and two adders 27 and 28. In the first estimation section 20, the coefficient multiplier 22 receives a control input signal u to be supplied to the plant object 100, and the coefficient multipliers 25 and 26 receive an output signal y from the plant object 100. The coefficient multiplier 22 multiplies the control input signal u as a vector with a predetermined coefficient matrix (E), and outputs a product signal. The coefficient multiplier 25 multiplies the output signal y as a vector with a predetermined coefficient matrix (G), and outputs a product signal.

The adder 27 adds the product signals from the coefficient multipliers 22 and 25 and the output signal from the feedback coefficient multiplier 23, and outputs a sum signal to the integrator 21. The integrator 21 integrates the sum signal from the adder 27, and outputs an integral signal to the coefficient multipliers 23 and 24. The coefficient multiplier 23 multiplies the integral signal from the integrator 21 with a predetermined coefficient matrix (F), and feeds back the product signal to the adder 27. The coefficient multiplier 24 multiplies the output signal from the integrator 21 with a predetermined coefficient matrix (H), and inputs a product signal to one input terminal of the adder 28. The other input terminal of the adder 28 receives a coefficient output signal from the coefficient multiplier 26, i.e., a signal obtained by multiplying the output signal y from the plant object 100 with the predetermined matrix (H). Therefore, the adder 28 adds the output signals from the coefficient multipliers 24 and 26, and supplies a sum signal to the switching section 40 as an output signal from the first estimation section 20.

The first estimation section 20 estimates a state value or variable representing the state of the plant object 100. For example, when the plant object 100 is expressed by a quadratic transfer function, two state variables $x_0$ and $x_1$ are estimated; when the object 100 is expressed by a quartic transfer function, four state variables $x_0$, $x_1$, $x_2$, and x3 are estimated. Note that, the state variable x0 represents a heat flow (a temporal change in heat energy), for example; x1, a wafer temperature, for example; x2, Tc or a temporal thermal moving amount from a wafer upper surface, for example; and x3, a state variable (amount of Tc), for example.

Since the first estimation section 20 fetches the output signal y from the plant object 100, even when the state of the plant object 100 drifts due to inside error (e.g. numerical error or quantization error) and disturbance, the estimated value of the state variable representing the state can be obtained from the output of the adder 28.

The pseudo section, i.e., the second estimation section 30 corresponds to a plant model which mathematically approximates the plant object 100, and comprises an integrator 31, two coefficient multipliers 32 and 33, and an adder 34. In the second estimation section 30, the coefficient multiplier 32 multiplies the control input signal u as a vector with a predetermined coefficient matrix (Bp), and outputs a product signal to the adder 34. The adder 34 adds the output signal from the coefficient multiplier 32 to the output signal from the feedback multiplier 33, and outputs a sum signal to the integrator 31. The integrator 31 integrates the sum signal from the adder 27, supplies an integral output signal to the coefficient multiplier 33, and also supplies the integral output signal to the switching section 40 as an output signal from the second estimation section 30.

The coefficient matrices (Bp) and (Ap) of the coefficient multipliers 32 and 33 are obtained by a predetermined identification method to have the plant object 100 as a to-be-identified system.

In the second estimation section 30 as well, for example, when the plant object 100 is expressed by a quartic transfer function, four state variables x0, x1, x2, and x3 are estimated. However, since the second estimation section fetches the control input signal u alone to be supplied to the plant object 100, and does not fetch the output signal y from the plant object 100, neither an inside error nor disturbance of the plant object 100 are observed, and the estimated value of the state variable representing the state defined by the transfer function of the plant object 100 is obtained.

The switching section 40 switches the first and second estimation sections 20 and 30, and comprises the first delay process section 41, the second delay process section 46, and the adder 52. The first delay process section 41 has gradually rising characteristics for multiplying the output signal from the first estimation section 20 with a weighting coefficient $(1-e^{-t/T})$ of a first-order lag. The second delay process section 46 has gradually falling characteristics for multiplying the output signal from the second estimation section 30 with a weighting coefficient $e^{-t/T}$ of a first-order lag. The adder 52 adds the output signals from the first and second delay process sections 41 and 42.

In the switching section 40, in a warm-up state of the system, as shown in FIG. 8, as the output signal from the second delay process section 46 is gradually attenuated according to the time characteristics of $e^{-t/T}$, the output signal from the first delay process section 46 gradually rises according to the time characteristics of $(1-e^{-t/T})$. Thus, immediately after the beginning of a warm-up state, the state variable estimated by the second estimation section 30 is output, and during a stable period after an elapse of a predetermined period of time, the state variable estimated by the first estimation section 20 is output. During a switching period, a state variable, which is obtained by respectively multiplying the state variables from the two sections with the weighting coefficients $e^{-t/T}$ and $(1-e^{-t/T})$, and adding the products, is output.

The servo section 60 is an integral type optimal servo for feeding back the output (state variable) from the switching section 40 to the input side, and comprises an integrator 61, three coefficient multipliers 62, 63, and 64, and two adders 65 and 66. One input terminal of the adder 65 receives a desired value u0 for the plant object 100, and the other input terminal thereof receives a primary feedback variable obtained by multiplying the output (state variable) from the switching section 40 with a predetermined coefficient matrix (C) from the first feedback multiplier 63. The output (deviation) from the adder 65 is supplied to one input terminal of the adder 66 via the coefficient multiplier 62 for multiplying an input with a predetermined coefficient matrix (K2) and the integrator 61. The other input terminal of the adder 66 receives a secondary feedback variable obtained by multiplying the output (state variable) from the switching section 40 with a predetermined coefficient matrix (K1) from the second feedback coefficient multiplier 64. Note that the coefficient matrix (K1) and (K2) each are a feedback matrix obtained as a solution of an optimal servo problem. The coefficient matrix (C) may be omitted when the output from the plant object 100 is equal to a certain state variable.

In the control system of this embodiment, the first estimation section 20 estimates an actual state variable reflecting an inside error and disturbance of the plant object 100, and the second estimation section 30 estimates a simulative state variable inherent to the plant object 100. The state variable from the first or second estimation section 20 or 30 is supplied to the servo section 60 via the switching section 40, and the servo section 60 adjusts the control input u according to the state variable. As described above, since the system for feeding back a vectrial conditional variable can feed back the state and change in the plant object in more detail to the input side as compared to a system for feeding back only the output from the plant object, even when the output y from the plant object 100 is different from a control variable, the control variable can be caused to coincide with a desired value with high precision.

Furthermore, in the control system of this embodiment, the first estimation section 20 for estimating an actual state variable reflecting an inside error and disturbance of the plant object 100 is finally used. However, in a transient state immediately after the beginning of a warm-up state of the system, the second estimation section 30 for simulatively estimating the state variable of the plant object 100 is preferentially used. More specifically, when the first estimation section 20 estimates a state variable earlier than an actual state of the plant object 100, the estimated value becomes unstable depending on the initial value of the control variable or the servo weighting coefficient, and the control variable may overshoot or undershoot in a warm-up state of the system. On the other hand, since the second estimation section 30 does not monitor the output y from the plant object 100, it cannot estimate an actual state variable in the plant object 100. However, the section 30 can provide a stable estimated value according to the original characteristics of the plant object 100 in a warm-up state of the system. Therefore, before the estimated value from the first estimation section 20 is stabilized, the estimated value from the second estimation section 30 is temporarily used, so that stable and high-precision feedback control can be executed even during a transient period immediately after the beginning of a warm-up state of the system.

Figure 4:
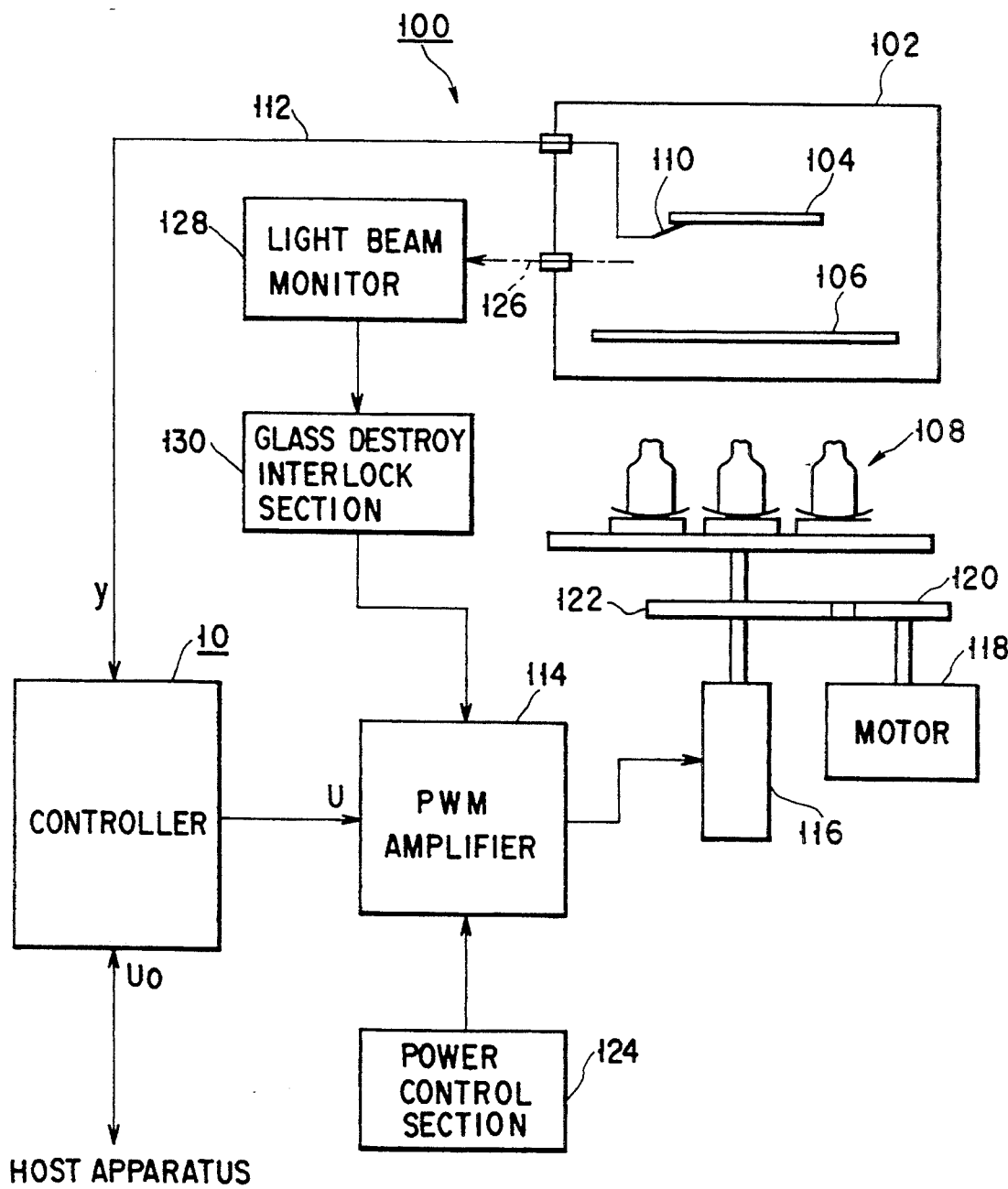
FIG. 4 is a diagram showing an arrangement of a wafer temperature control apparatus using the control system of the present invention.

FIG. 4 shows an example wherein the plant object 100 in the control system of the above embodiment comprises a wafer temperature control arrangement. With this example, the wafer temperature control arrangement is used in, e.g., a CVD apparatus. In FIG. 4, sections except for a controller 10 correspond to the plant object 100.

In the temperature control arrangement shown in FIG. 4, a semiconductor wafer 104 as a plant object is arranged at a predetermined position by a predetermined support member (not shown), and a quartz window 106 is arranged on a chamber bottom portion below the wafer 104. Heating lamps 108 are arranged outside a chamber 102. Light beams emitted from the heating lamps 108 are radiated on the lower surface of the wafer 104 via the quartz window 106, and the wafer 104 is heated by light energy of these beams. The upper surface of the wafer 104 is a to-be-treated surface, and the temperature of this to-be-treated surface is a control variable. A thermocoupler 110 as a temperature sensor is attached to the peripheral edge portion of the lower surface of the wafer, and the output voltage from the thermocoupler 110 is supplied to the controller 10 via a cable 112 as the output y from the plant object 100. The thermocoupler 110 is shielded by a shielding plate (not shown) so as not to cause light beams emitted from the heating lamps 108 to be incident on the thermocoupler 110.

The heating lamps 108 receive an electric power from a PWM amplifier 114 via a slip ring 116, and radiate light beams onto the wafer 104 while being integrally rotated with a rotational shaft 124 by a rotary driving mechanism comprising a motor 118, and gears 120 and 122.

The PWM amplifier 114 receives a temperature control voltage from the controller 10 as the control input u, power-amplifies the temperature control voltage, and supplies the amplified voltage to the heating lamps 108 as a PWM signal. A power control section 124 ON-/OFF-controls the PWM amplifier 114 in a system warm-up state or an abnormal state.

In the vacuum chamber 102, one end of an optical fiber 126 is interposed between the wafer 104 and the quartz window 106, and the other end of the optical fiber 126 detects a light beam (intensity) via the optical fiber 126. The light beam detection value is supplied to a glass destroy interlock section 130. When the quartz window 106 is turbid, since light energy absorbed by the quartz window 106 is increased, light energy supplied to the wafer 104 is decreased accordingly, and danger of destroy of the quartz window 106 is increased. Thus, when the light beam detection value is decreased to a predetermined value, the glass destroy interlock section 130 supplies a heating stop signal to the PWM amplifier 114 to turn off the heating lamps 118.

Figure 5:
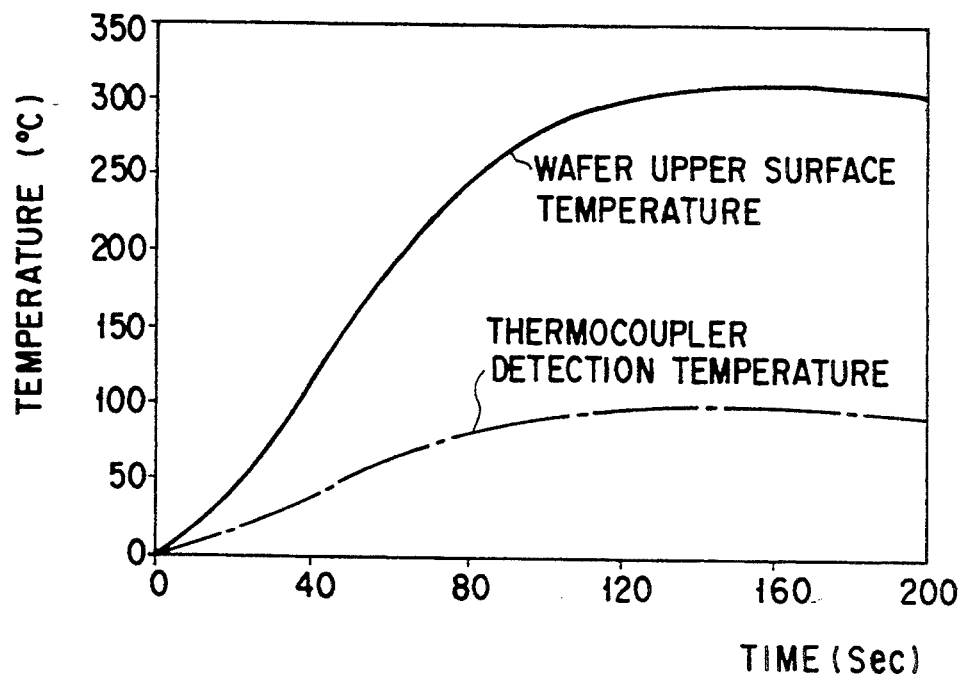
FIG. 5 is a graph showing the deviation between the wafer surface temperature and the thermocoupler detection temperature.

In the wafer temperature control arrangement described above, the output y from the plant object 100 represents the temperature of the lower surface of the wafer 104, and does not represent the temperature of the upper surface (to-be-treated surface), as the control variable, of the wafer 104. FIG. 5 shows an example of the time characteristics of the upper surface temperature of the wafer 104 and the thermocoupler detection temperature (the temperature of the peripheral edge portion of the lower surface of the wafer 104) when the wafer temperature control arrangement is started while the desired value of the control variable (wafer upper surface temperature) is set to be 300° C. As shown in FIG. 5, a time lag is generated between the wafer upper surface temperature and the thermocoupler detection temperature. FIG. 5 shows the characteristics when no estimation section is used, and as is apparent from FIG. 5, the rising speed of the wafer upper surface temperature is slow.

In this embodiment, the control variable (wafer upper surface temperature) may be modeled as one state variable in the plant object 100. A system from light emission energy of the heating lamps 108 to the temperature of the central portion of the lower surface of the wafer 104 may be defined as a second-order lag system, a system from the temperature of the central portion of the lower surface of the wafer 104 to the temperature of the peripheral edge portion of the lower surface of the wafer, i.e., the detection temperature (y) of the thermocoupler 110, via the wafer upper surface temperature may be defined as another second-order lag system, and these two second-order lag systems may be defined as cascade-connected systems, so that this plant object 100 may be modeled to a quartic system. In this case, four state variables x0, x1, x2, and x3 are defined. Of these variables, for example, x1 corresponds to a control variable (wafer upper surface temperature), and x3 corresponds to the output y.

The controller 10 of this embodiment can stably execute temperature control for causing the control variable to coincide with the target value with high precision from a time immediately after the beginning of a warm-up state of the system since it uses both the first and second estimation sections 20 and 30.

Figure 6:
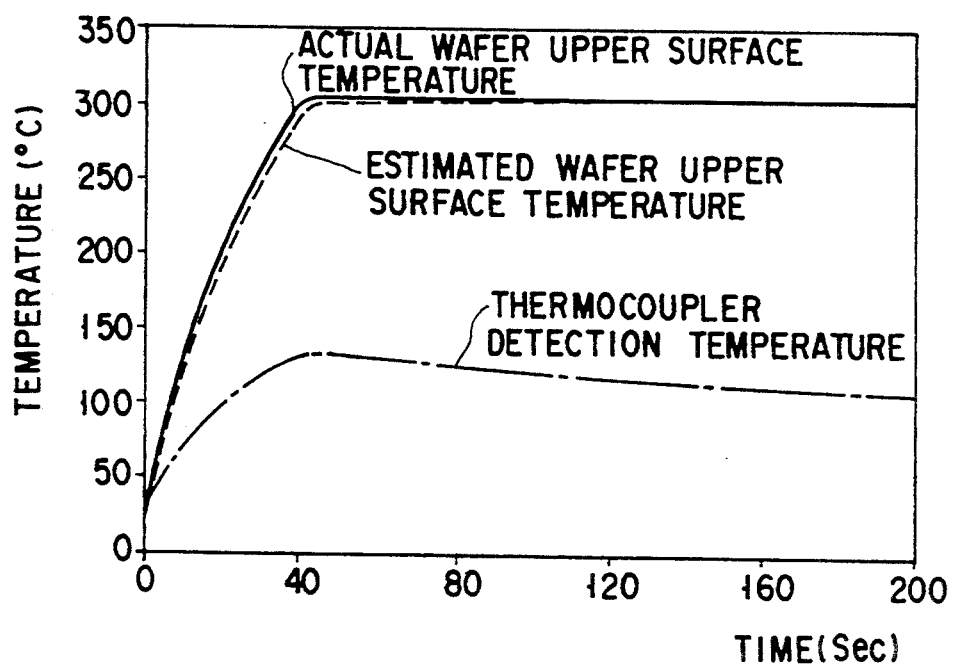
FIG. 6 is a graph showing the rising characteristics of the wafer surface temperature in the control system of the present invention.

FIG. 6 shows the operation characteristics of the control system of this embodiment. As compared to FIG. 5, i.e., a case wherein the first and second estimation sections 20 and 30 are not used, the rising speed of the wafer upper surface temperature becomes remarkably fast. Also, there is no fear of overshoot or undershoot of the control variable.

FIG. 7 shows the characteristics obtained when the first estimation section 20 is operated from the beginning of a warm-up state of the system without using the pseudo system, i.e., the second estimation section 30. As can be understood from FIG. 7, if the first estimation section 20 estimates a state variable earlier than an actual state of the plant object 100, the estimated value may reversely respond and considerably vary depending on the initial value of the control variable or the servo weighting coefficient, and the control variable may overshoot or undershoot in a warm-up state.

In this embodiment, the present invention is applied to the wafer temperature control arrangement, but may be applied to other temperature control arrangements, and various other control arrangements. In this embodiment, the estimation section is switched from the second estimation section 30 to the first estimation section 20 in a warm-up state of the system. Even in a case other than the warm-up state, the estimation section may be conditionally switched from the second estimation section to the first estimation section and vice versa, as needed. Furthermore, in this embodiment, a first-order lag factor is switched. Alternatively, a multi-order lag factor such as a second-order or third-order lag factor may be switched as long as a necessary condition capable of approximating to a linear system, is satisfied.

The arrangement of the servo section 60 may be arbitrarily modified. The first and second estimation sections 20 and 30 are not limited to the Luenberger observer and the pseudo system, respectively, and may comprise various other observers.

Figure 9:
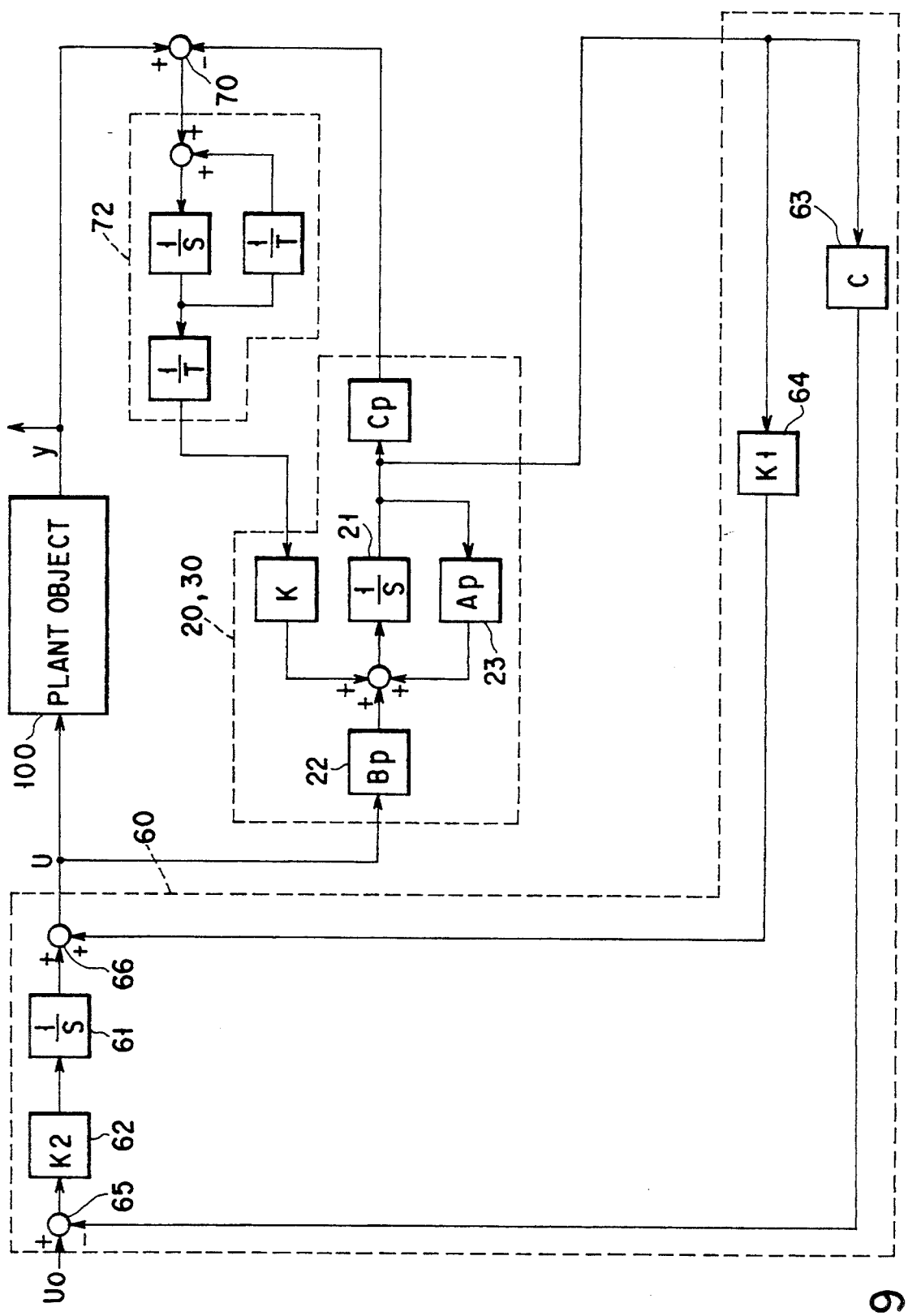
FIG. 9 is a block diagram showing a control system according to still another embodiment of the present invention.

As shown in FIG. 9, in the first estimation section 20, coefficient matrices [Bp] and [Ap] of the second estimation section 30 are respectively set in the coefficient multipliers 22 and 23, and these coefficient multipliers 22 and 23 and an integrator may be commonly used for the second estimation section 30. In this case, the output y from the plant object 100 is supplied to the first and second estimation sections 20 and 30 via an adder 70 and a delay process section 72 of the switching section. The output from the first or second estimation section 20 or 30 is supplied to the other input terminal of the adder 70, and is also supplied to the servo section 60.

In a warm-up state of the system, since the output y from the plant object 100 is supplied to the first estimation section 20 via the first delay process section 41 with a time lag of $(1-e^{-t/T})$, the output from the first estimation section 20 rises after the time lag of $(1-e^{-t/T})$. On the other hand, the output from the second estimation section 30 is attenuated via the second delay process section 46 with a time lag of $e^{-t/T}$. Thus, immediately after the beginning of a warm-up state, the adder 52 of the switching section 40 outputs a state variable estimated by the second estimation section 30, and in a stable period after an elapse of a predetermined period of time, the adder 52 outputs a state variable estimated by the first estimation section 20. During a switching period, a state variable, which is obtained by respectively multiplying the state variables from the two sections with the weighting coefficients $e^{-t/T}$ and $(1-e^{-t/T})$, and adding the products, is output.

An identification system, which can easily identify a desired to-be-identified plant even when it is difficult or impossible to directly check the response characteristics of a to-be-identified plant such as a wafer temperature control arrangement shown in FIG. 4 or when a to-be-identified plant is changed, will be described below with reference to FIG. 10.

A plant identification section 210 comprises a microcomputer, and functionally comprises an identification input generating section 212, an identification output recovery section 214, and an identification arithmetic process section 216. The identification input generating section 212 generates an input signal for plant identification, e.g., a step signal, a normal random number signal, and the like. The identification output recovery section 214 fetches a response output from a plant or a system output, linearly approximates the fetched output data using a look-up table comprising, e.g., a ROM, and stores the approximated data in a memory. The identification arithmetic process section 216 executes an identification arithmetic process (to be described later) to obtain parameters of a to-be-identified plant.

A wafer heating plant 220 is an internal plant corresponding to a portion for heating the upper surface of the wafer 104 according to a manipulated variable from the controller 10 in the wafer temperature control arrangement 100 shown in FIG. 4. This wafer heating plant 220 includes a wafer plant 222 as a heat conduction system from the heating lamps 108 to the upper surface (to-be-treated surface) of the wafer 104, the PWM amplifier 114 of an electrical signal process system, a D/A converter 140a in an output section in the controller 10, and the like.

A wafer temperature measuring plant 230 is an internal plant corresponding to a portion for feeding back the temperature of the wafer 104 to the controller 10 in the wafer temperature control arrangement 100 shown in FIG. 4. The wafer temperature measuring plant 230 includes a sensor plant 232 as a heat conduction/thermal conversion system from the surface of the wafer 104 to the output terminal of the thermocoupler 110, urged against the peripheral edge portion of the lower surface of the wafer, for detecting the temperature of the peripheral edge portion, a sensor output transmission section 234 such as the cable 112 for transmitting the sensor output signal (y), an A/D converter 140b in an input section in the controller 10, and the like. The sensor output transmission section 234 includes a switch or a multiplexer for switching an output between an output signal from the thermocoupler 110 and an output signal from an identification thermocoupler 240 (FIG. 11; to be described later) for performing an actual measurement.

In the wafer temperature control arrangement 100, the wafer heating plant 220 and the wafer temperature measuring plant 230 are respectively internal plants of a linear system. These plants 220 and 230 are coupled in series with each other, and are related to each other.

The operation of the identification system shown in FIG. 10 will be described below.

Figure 11:
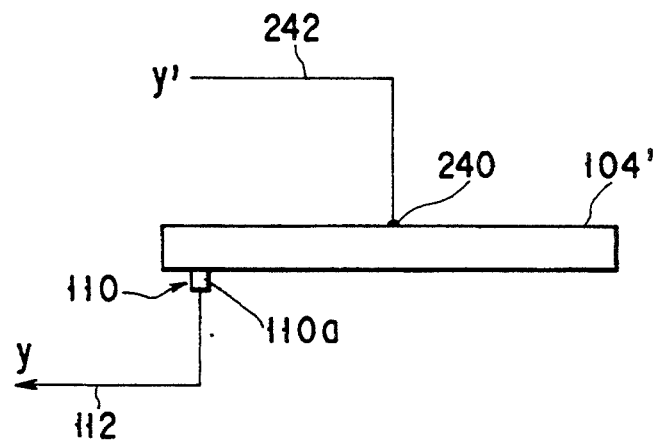
FIG. 11 is a schematic view showing main part of an experimental model for actually measuring the response characteristic of a wafer temperature measuring plant shown in FIG. 10.
Figure 11:
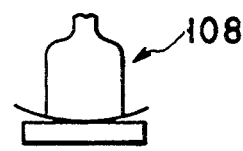

This identification system is applied to identification of the wafer heating plant 220 when the plant 220 has unknown parameters. Upon practicing of the plant identification system, the parameters of the wafer temperature measuring plant 230 as a related plant of the wafer heating plant 220 must be known, and a mathematical model of the plant 230 must be determined. For this purpose, the temperature measuring plant 230 is identified in advance by an actual measurement. In order to execute this identification, as shown in FIG. 11, an identification wafer 104' is placed in the vacuum chamber 102, and the identification thermocoupler 240 is attached to the central portion of the upper surface of the wafer 104'. The output terminal of the thermocoupler 240 is connected to the other input terminal of the switch in the sensor output transmission section 234 via a cable 242. The thermocoupler 110 which is the same as that used in a CVD process is brought into contact with the peripheral edge portion of the lower surface of the wafer 104' via a thermally conductive cap 110a. The thermally conductive cap 110a serves to stabilize the contact state between the thermocoupler 110 and the wafer 104, and to eliminate the thermal influence of an atmospheric gas on the temperature sensitive portion of the thermocoupler 110 in the CVD process.

First, the response characteristic of the wafer heating plant 220 is actually measured. For this purpose, the sensor output transmission section 234 is switched to the identification thermocoupler 240. The identification input generating section 212 of the plant identification section 210 generates a predetermined digital signal Sin as an identification input. The digital identification input signal Sin is converted into an analog signal by the D/A converter 140a, and the analog signal is input to the PWM amplifier 114 as a temperature control voltage. The PWM amplifier 114 supplies a PWM signal (electric power) to the heating lamps 108 according to the temperature control voltage. The heating lamps 108 emit light upon reception of the electric power, and the wafer 104' is heated by light energy radiated from the heating lamps 108. As a result, the upper surface temperature of the wafer 104' is increased with a time lag inherent to the wafer plant 222. The wafer upper surface temperature is detected by the thermocoupler 240. The output signal from the thermocoupler 240 is supplied to the A/D converter 140b via the sensor output transmission section 234, and is converted into a digital signal. The digital signal is fetched by the identification output recovery section 214 of the plant identification section 210 as a response output Sout of the wafer heating plant 220. The response output data Sout of the wafer heating plant 220, which is fetched by the identification output recovery section 214, is stored in the memory in the identification output recovery section 214.

Then, the response characteristic of the wafer temperature measuring plant 230 is actually measured. For the purpose of this actual measurement, the sensor output transmission section 234 is switched to the normal temperature detection thermocoupler 110. The identification input generating section 212 of the plant identification section 210 supplies the same digital identification input signal Sin as described above to the D/A converter 140a of the wafer heating plant 220. Thus, the lamps 108 emit light, the wafer 104' is heated by light energy, and the upper surface temperature of the wafer 104' is increased with a time lag inherent to the wafer plant 222. The temperature of the peripheral edge portion of the lower surface of the wafer 104' is detected by the thermocoupler 110. The output signal from the thermocoupler 110 is supplied to the A/D converter 140b via the sensor output transmission section 234, and is converted into a digital signal. This digital signal is fetched by the identification output recovery section 214 of the plant identification section 210 as an output Sout of the system including the wafer heating plant 220 and the wafer temperature measuring plant 230. In this case, the wafer temperature measuring plant 230 receives the output Sout from the wafer heating plant 220 as an input, and outputs the output Sout. The output S from the wafer heating plant 220 is held in the memory in the identification output recovery section 214 in the previous actual measurement of the response characteristic of the wafer heating plant 220. Therefore, the input data S and the output data Sout in the wafer temperature measuring plant 230 are prepared, and the response characteristic of the wafer temperature measuring plant 230 is actually measured.

The identification arithmetic process section 216 obtains parameters of the wafer temperature measuring plant 230 on the basis of the measured response characteristic using a predetermined parameter calculation method, e.g., a least square method. When the parameters of the wafer temperature measuring plant 230 are obtained, the wafer temperature measuring plant 230 is identified, and its mathematical model is determined.

In the wafer heating plant 220 as well, parameters can be calculated based on its response output S. However, when the wafer 104 in an actual CVD process is different from the identification wafer 104' or when the heating lamps, the PWM amplifier 114, and the like are changed or modified, the parameters of the wafer heating plant 220 are undesirably changed. In contrast to this, in the wafer temperature measuring plant 230, even when the identification wafer 104' is replaced with an actual wafer 104, such a change does not influence the response characteristics, and the apparatus circuit is rarely changed or modified. For this reason, the wafer temperature measuring plant 230 can be re-identified using a reference wafer having known parameters by a method to be described later. Therefore, the parameters and the mathematical model of the wafer temperature measuring plant 230, which are obtained using an experimental model, as described above, can be directly applied to an actual CVD process.

Figure 12:
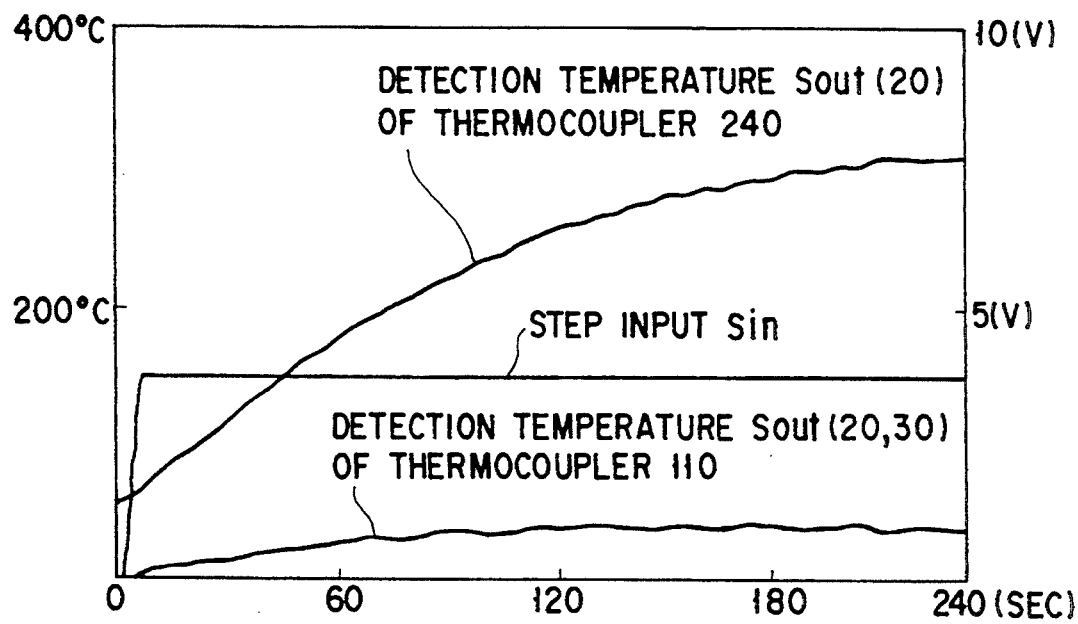
FIG. 12 is a graph showing the response characteristics of a wafer heating plant and a wafer temperature measuring plant in response to a step waveform input.
Figure 13:
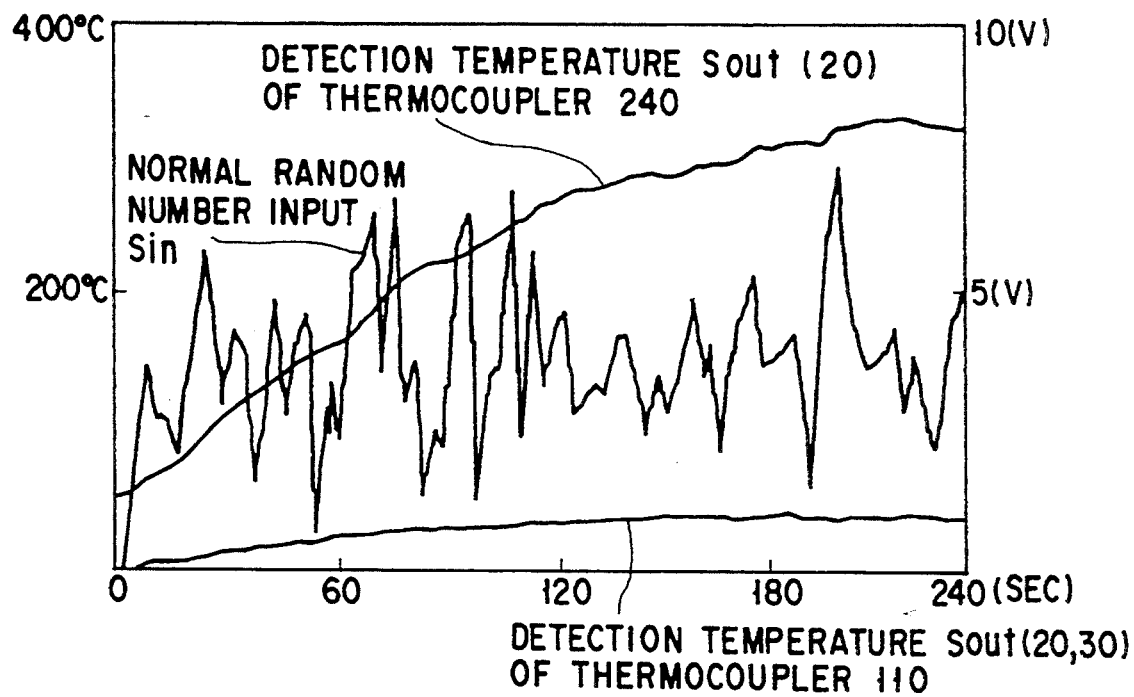
FIG. 13 is a graph showing the response characteristics of the wafer heating plant and the wafer temperature measuring plant in response to a normal random number input.

FIGS. 12 and 13 show the response characteristics of the wafer heating plant 220 and the wafer temperature measuring plant 230 obtained by the above-mentioned actual measurements. FIG. 12 shows the characteristics obtained when a step waveform signal is used as the input signal Sin, and FIG. 13 shows the characteristics obtained when a normal random number is used as the input signal Sin.

When the parameters of the wafer heating plant 220 are changed for the above-mentioned reason, the plant identification system of this embodiment is used. In this identification system, the identification thermocoupler 240 is not used. Therefore, the sensor output transmission section 234 is connected to the normal temperature detection thermocoupler 110. The identification input generating section 212 of the plant identification section 210 generates a proper digital signal Sin as an identification input signal. This digital signal Sin may be the same as or different from the signal used in identification by the actual measurement. The digital identification input signal Sin is converted into an analog signal by the D/A converter 140a, and the analog signal is input to the PWM amplifier 114 as a temperature control voltage. The PWM amplifier 114 supplies a PWM signal (electric power) according to the temperature control voltage to the lamps 108. Upon reception of the electric power, the heating lamps 108 emit light, and the wafer 104 is heated by light energy radiated from the heating lamps 108. As a result, the upper surface temperature of the wafer 104 is increased with a time lag inherent to the wafer heating plant 220. The temperature of the peripheral edge portion of the lower surface of the wafer 104 is detected by the thermocoupler 110. The output signal from the thermocoupler 110 is supplied to the A/D converter 140b via the sensor output transmission section 234, and is converted into a digital signal. The digital signal is fetched by the identification output recovery section 214 of the plant identification section 210 as an output Sout of the system including the wafer heating plant 220 and the wafer temperature measuring plant 230.

In this embodiment, the identification arithmetic process section 216 of the plant identification section 210 identifies the wafer heating plant 220 having unknown parameters in accordance with the following algorithm. As shown in FIG. 10, since the wafer heating plant 220 and the wafer temperature measuring plant 230 are coupled in series with each other as internal plants, mathematical models $G1(Z^{-1})$ and $G2(Z^{-2})$ corresponding to the plants 220 and 230 are expressed as serially coupled ones.

These mathematical models $G1(Z^{-1})$ and $G2(Z^{-2})$ are expressed by the following equations when discrete ARMA (autoregressive moving average) models are used:

$$G1(Z^{-1}) = (a11Z^{-1} + \ldots a1nZ^{-1})/(1 + b11Z^{-1} + \ldots b1nZ^{-1}) \quad (1)$$

$$G2(Z^{-1})=(a21Z^{-1}+\ldots a2nZ^{-1})/(1+b21Z^{-1}+\ldots b2nZ^{-1}) \quad (2)$$

In this case, since the wafer heating plant 220 is a to-be-identified plant, the parameters a11, ..., a2n, b21, ..., b2n of the mathematical model $G1(Z^{-1})$ are known. Since these mathematical models $G1(Z^{-1})$ and $G2(Z^{-2})$ are linear models, even when the mathematical models $G1(Z^{-1})$ and $G2(Z^{-2})$ are replaced with each other, the same output signal Sout as that obtained when they are not replaced with each other can be obtained in response to a predetermined input signal Sin. Therefore, a response output [Sout(30)] of the mathematical model $G2(Z^{-1})$ of the wafer temperature measuring plant 230 in response to an [input Sin] is given by:

$$[Sout(30)]=G2(Z^{-1})\cdot Sin \quad (3)$$

where [Sin] is the value (data) of the digital signal Sin generated by the identification input generating section 212 in the above-mentioned actual measurement.

The response output [Sout(30)] of the model $G2(Z^{-1})$ obtained from equation (3) serves as an input to the mathematical model $G1(Z^{-1})$ of the wafer heating plant 220. Therefore, as for the mathematical model $G1(Z^{-1})$, the following equation is established:

$$G1(Z^{-1})\cdot[Sout(30)]=[Sout(30,20)]=Sout(20,30) \quad (4)$$

where [Sout(30,20)] is the response output obtained in the case of the mathematical model $G2(Z^{-1})\cdot G1(Z^{-1})$, [Sout(20,30)] is the response output obtained in the case of the mathematical model $G1(Z^{-1})\cdot G2(Z^{-1})$, and each of these outputs is the value of the system output Sout(20,30) fetched by the identification output recovery section 214 by the actual measurement.

When the number of unknown parameters a11, ..., a1n, b11, ..., b1n of the model $G1(Z^{-1})$ is 2n, if 2n combinations of [Sout(30)] and corresponding [Sout(20,30)] are given, 2n equations are derived from equation (4). Therefore, by solving these equations, all the unknown parameters a11, ..., a1n, b11, ..., b1n can be obtained. When parameters with still higher precision are to be obtained, for example, a least square method, a parameter calculation method using, e.g., a Kalman filter, and the like may be used.

The mathematical model $G1(Z^{-1})$ of the wafer heating plant 220 is determined by the parameters a11, ..., a1n, b11, ..., b1n, which are obtained as described above. A estimation section designed based on this model $G1(Z^{-1})$, e.g., a single dimension estimation section or a least dimension estimation section is installed in the controller 10 (FIG. 4), and an optimal feedback parameter is determined. Thus, in the wafer temperature control arrangement 100, optimal feedback control is executed, so that the temperature of the to-be-treated surface (upper surface) of the wafer 104 is caused to coincide with a target value.

Figure 14:
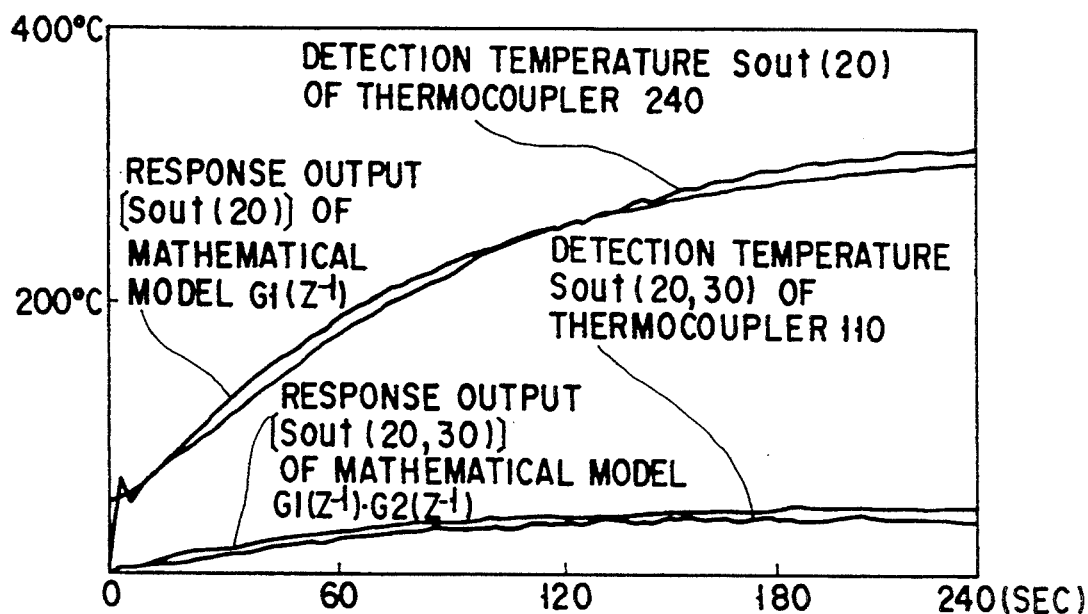
FIG. 14 is a graph showing a verification example of response outputs from mathematical models of the identified wafer heating plant and wafer temperature measuring plant in contrast to actually measured response outputs.

In the wafer heating plant 220, for example, when the type of the wafer 104 is changed, and the parameters are changed, the plant identification method of the above embodiment can be performed again. In this embodiment, re-identification can be easily executed since the plant identification system of this embodiment calculates the parameters of the wafer heating plant 220 according to an algorithm using the mathematical model $G2(Z^{-1})$ of the wafer temperature measuring plant 230 having known parameters without using any experimental model. Also, the entire system is not identified as one plant, but is divided into internal plants, i.e., the wafer heating plant 220 and the wafer temperature measuring plant 230, and a to-be-identified plant (wafer heating plant 220) alone is identified. Therefore, parameters with high precision can be obtained, and an estimation section having a high presumption capacity can be designed. FIG. 14 shows an example for verifying the response output of the mathematical model $G1(Z^{-1})$ of the wafer heating plant 220 in contrast to the response output of the plant 220 obtained by the actual measurement. The response output [Sout(20)] of the mathematical model $G1(Z^{-1})$ is calculated using the following equation:

$$[Sout(20)]=G1(Z^{-1})\cdot[Sin] \quad (5)$$

On the other hand, the response output Sout(20) of the plant 220 obtained by the actual measurement is an actually measured by obtained from the identification thermocoupler 240 using the experimental model shown in FIG. 11. As shown in FIG. 14, the response output [Sout(20)] of the mathematical model $G1(Z^{-1})$ approximates the response output Sout(20) of the plant 220 obtained by the actual measurement well. FIG. 14 also shows an example for, when the sensor plant is changed, verifying the response output [Sout(20,30)] of $G2(Z^{-1})$ of the mathematical model $G1(Z^{-1})\cdot G2(Z^{-1})$ determined by the parameters obtained when $G2(Z^{-1})$ is presumed using known $G1(Z^{-1})$ in contrast to the response output (detection temperature of the thermocoupler 110) Sout(20,30) of the plants 220 and 230 obtained by the actual measurement.

In this embodiment, the wafer temperature control arrangement 100 is expressed by two internal plants, i.e., the wafer heating plant 220 and the wafer temperature measuring plant 230. In addition to these plants, other internal plants may be taken into consideration. For example, when light emitted from the heating lamps 108 is directly radiated onto the feedback thermocoupler 110, this bypass heat conduction system may be coupled as a "direct heat conduction plant" in parallel with the series plants of the wafer heating plant 220 and the wafer temperature measuring plant 230. In this case, the response characteristic of the direct heat conduction plant can be actually measured as an output signal Sout(50) of the thermocoupler 110 in response to the input Sin from the identification input generating section 212 in a state wherein the wafer 104 is removed. The parameters of the direct heat conduction plant can be calculated from the actually measured response characteristic.

Since the direct heat conduction plant is an internal plant connected in parallel with the series plants of the wafer heating plant 220 and the wafer temperature measuring plant 230, an output obtained by adding the output Sout(20,30) from a combination of the wafer heating plant 220 and the wafer temperature measuring plant 230 in response to the input Sin and the response output Sout(50) of the direct heat conduction plant in response to the input Sin is obtained as a response output (response output of the thermocoupler 110) Sout(20,30/50) of the entire system. Therefore, in this embodiment, when the wafer heating plant 220 is identified by the algorithm, a mathematical model $G3(Z^{-1})$ of the direct heat conduction plant is connected in parallel with the series model $G1(Z^{-1})\cdot G2(Z^{-1})$ of the mathematical models $G1(Z^{-1})$ and $G2(Z^{-1})$, and parameters a31, ..., a3n, b31, ..., b3n of this mathematical model $G3(Z^{-1})$ have already been obtained by the above-mentioned measurement and are known parameters.

When the response output [Sout(50)] of the mathematical model $G3(Z^{-1})$ in response to the input [Sin] is subtracted from the system output Sout(20,30/50), the response output Sout(20,30) from the combination of the wafer heating plant 220 and the wafer temperature measuring plant 230 can be obtained. Thereafter, the same processes as those for the mathematical model $G1(Z^{-1})\cdot G2(Z^{-1})$ are executed, and the response characteristic and parameters a11, ..., a1n, b11, ..., b1n of the model $G1(Z^{-1})$ can be obtained on the basis of the system input Sin, the system output Sout(20,30), and the response characteristic of the known model $G2(Z^{-1})$ as in the mathematical model $G2(Z^{-1})\cdot G1(Z^{-1})$.

In this manner, even when the system includes a large number of plants, as long as all plants except for a to-be-identified plant have known parameters, the response characteristics of a mathematical model of the to-be-identified plant can be obtained on the basis of system input/output data and the response characteristics of mathematical models of other plants, and the parameters of the to-be-identified plant can be calculated from the response characteristic of the mathematical model by a predetermined parameter calculation method.

In the identification process of the algorithm in the above embodiment, the response output [Sout(30)] obtained when the input [Sin] is supplied to the known model $G2(Z^{-1})$ is calculated like in the mathematical model $G2(Z^{-1})\cdot G1(Z^{-1})$, the response output [Sout(30)] is defined as the known input of the unknown model $G1(Z^{-1})$, and the response characteristic of the unknown model $G1(Z^{-1})$ is calculated from the known input [Sout(30)] and the response output [Sout(30,20)] of the model $G1(Z^{-1})$ corresponding to the known system output Sout(30,20). This method has an advantage of easy arithmetic processes. However, in the case of the mathematical model $G1(Z^{-1})\cdot G2(Z^{-1})$, the response characteristic and parameters of the unknown model $G1(Z^{-1})$ can also be obtained. More specifically, the input of the model $G2(Z^{-1})$ is inversely calculated from the parameters of the known model $G2(Z^{-1})$ and the known system output Sout(20,30), and the inversely calculated input of the model $G2(Z^{-1})$ is determined as the response output [Sout(20)] of the unknown model $G1(Z^{-1})$ in response to the known input [Sin], thus obtaining the response characteristic and parameters of the model $G1(Z^{-1})$.

In the above embodiment, the present invention is applied to the wafer temperature control arrangement. The identification system of the present invention can also be applied to other temperature control arrangements, and various other control arrangements.

According to the identification system of the present invention, since parameters of a to-be-identified plant can be obtained by utilizing a known mathematical model of related plants included in the same system as the to-be-identified plant, even when it is difficult or impossible to directly check the response characteristic of the to-be-identified plant, or when the to-be-identified plant is changed, the to-be-identified plant can be easily identified.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A control system comprising:
   an estimation section for estimating a control variable of a plant object on the basis of a control input alone;
   a switching section for selecting one of an output from said plant object and an output from said estimation section; and
   a servo section for adjusting the control input by feeding back the output from said plant object and the control variable from said estimation section to an input section of said plant object.

2. A system according to claim 1, wherein said switching section comprises means for selecting said estimation section in a warm-up state of said control system and selecting said plant object after a predetermined time lag in the warm-up state.

3. A system according to claim 2, wherein said switching section comprises a delay processing section for receiving the output from said plant object, and having gradually rising characteristics, and another delay processing section for receiving the state variable from said estimation section, and having gradually falling characteristics.

4. A control system comprising:
   a first estimation section for estimating a first state variable of a plant object on the basis of a control input supplied to said plant object and an output from said plant object;
   a second estimation section for estimating a second state variable of said plant object on the basis of the control input alone;
   a switching section for selecting one of said first and second estimation sections; and
   a servo section for adjusting the control input by feeding back the state variable from one of said first and second estimation sections to an input section of said plant object.

5. A system according to claim 4, wherein said switching section comprises means for selecting said second estimation section in a warm-up state of said control system and selecting said first estimation section after a predetermined time lag in the warm-up state.

6. A system according to claim 5, wherein said switching section comprises a first delay processing section for receiving the state variable from said second estimation section, and having gradually rising characteristics, and a second delay processing section for receiving the state variable from said first estimation section, and having gradually falling characteristics.

7. A system according to claim 4, wherein said first estimation section comprises a Luenberger observer for receiving the control input to said plant object and a control output from said plant object, and estimating a state variable of said plant object on the basis of the control input and the control output.

8. A system according to claim 4, wherein said second estimation section comprises a pseudo plant object for outputting a state variable mathematically approximating said plant object in response to the control input.

9. A system according to claim 4, wherein said servo section comprises an integral optimal servo for feeding back an output from said switching section to said plant object.

10. A system according to claim 4, wherein said servo section comprises first feedback coefficient means for feeding back a first-order feedback variable obtained by multiplying a state variable via said switching section with a predetermined first coefficient matrix, second feedback coefficient means for feeding back a second-order feedback variable obtained by multiplying the state variable via said switching section with a predetermined second coefficient matrix, first addition means for obtaining a deviation between a target value and the first-order feedback variable, a coefficient multiplier for multiplying the deviation from said first addition means with a predetermined third coefficient matrix, an integrator for integrating an output from said coefficient multiplier, and an adder for adding an integral output from said integrator and the second-order feedback variable, and outputting the control input.

11. A system according to claim 4, wherein said plant object comprises a wafer temperature control arrangement of a wafer treatment system for treating a semiconductor wafer.

* * * * *